United States Patent [19]

Tomassetti et al.

[11] Patent Number: 5,450,327
[45] Date of Patent: Sep. 12, 1995

[54] SYSTEM FOR ADJUSTING THE BACK GAUGE OF A FLAT STOCK MATERIAL WORKING APPARATUS

[76] Inventors: John F. Tomassetti, 106 Woodcrest Way, Conklin, N.Y. 13748; Howard Buschman, 28 Avon Rd., Binghamton, N.Y. 13905

[21] Appl. No.: 775,387

[22] Filed: Oct. 15, 1991

[51] Int. Cl.$^6$ .................. G06F 15/46; G05B 19/18; G05B 11/01
[52] U.S. Cl. ............... 364/474.28; 364/167.01; 414/19; 318/569; 318/630
[58] Field of Search ............... 364/474.28, 167.01, 364/476, 424.1, 460; 318/567, 625, 640, 600, 696, 569, 590–594, 604, 630; 414/19; 354/437

[56] References Cited

U.S. PATENT DOCUMENTS

| | | | |
|---|---|---|---|
| 3,671,827 | 6/1972 | Foley et al. | 318/567 |
| 3,719,877 | 3/1973 | Murray et al. | 318/600 |
| 3,725,763 | 4/1973 | Tokarz | 318/600 |
| 3,738,504 | 6/1973 | Vail et al. | 214/19 |
| 4,112,493 | 9/1978 | Roch et al. | 364/476 |
| 4,156,170 | 5/1979 | Strunc | 318/696 |
| 4,280,182 | 7/1981 | Mickowski | 318/567 |
| 4,325,614 | 4/1982 | Grimes | 354/437 |
| 4,432,343 | 2/1984 | Riise et al. | 364/460 |
| 4,489,259 | 12/1984 | White et al. | 318/696 |
| 4,736,655 | 4/1988 | Kumura et al. | 364/424.1 |

OTHER PUBLICATIONS

Benjamin C. Kuo, "Automatic Control Systems", 1987, p. 3.

Primary Examiner—James Trammell

[57] ABSTRACT

The present invention features a manually operated apparatus for working flat stock. The system has a mechanism for automatically positioning a mechanically adjustable back gauge to a predetermined position. The automatic positioning is accomplished by means of a programmable microcontroller that controls the movement of a worm drive through a stepper motor. The worm drive is used to move the back gauge with respect to a working tool. The operator of the system sets a desired position of the back gauge relative to the work tool via input thumbwheel switches mounted on a control panel. The panel is connected to the microcontroller, and feeds the information thereto. The program of the microcontroller uses the thumbwheel switch input to drive the stepper motor in a fast drive mode until the back gauge comes into approximate vicinity of a starting position. Thereafter, the worm drive is driven at a slower speed to reach the start position. Once having been calibrated, the back gauge is then directed to the desired position setting with respect to the working tool. The adjusting system can be used with cutting, bending and other low cost, material working apparatus having the common need for precision alignment.

9 Claims, 5 Drawing Sheets

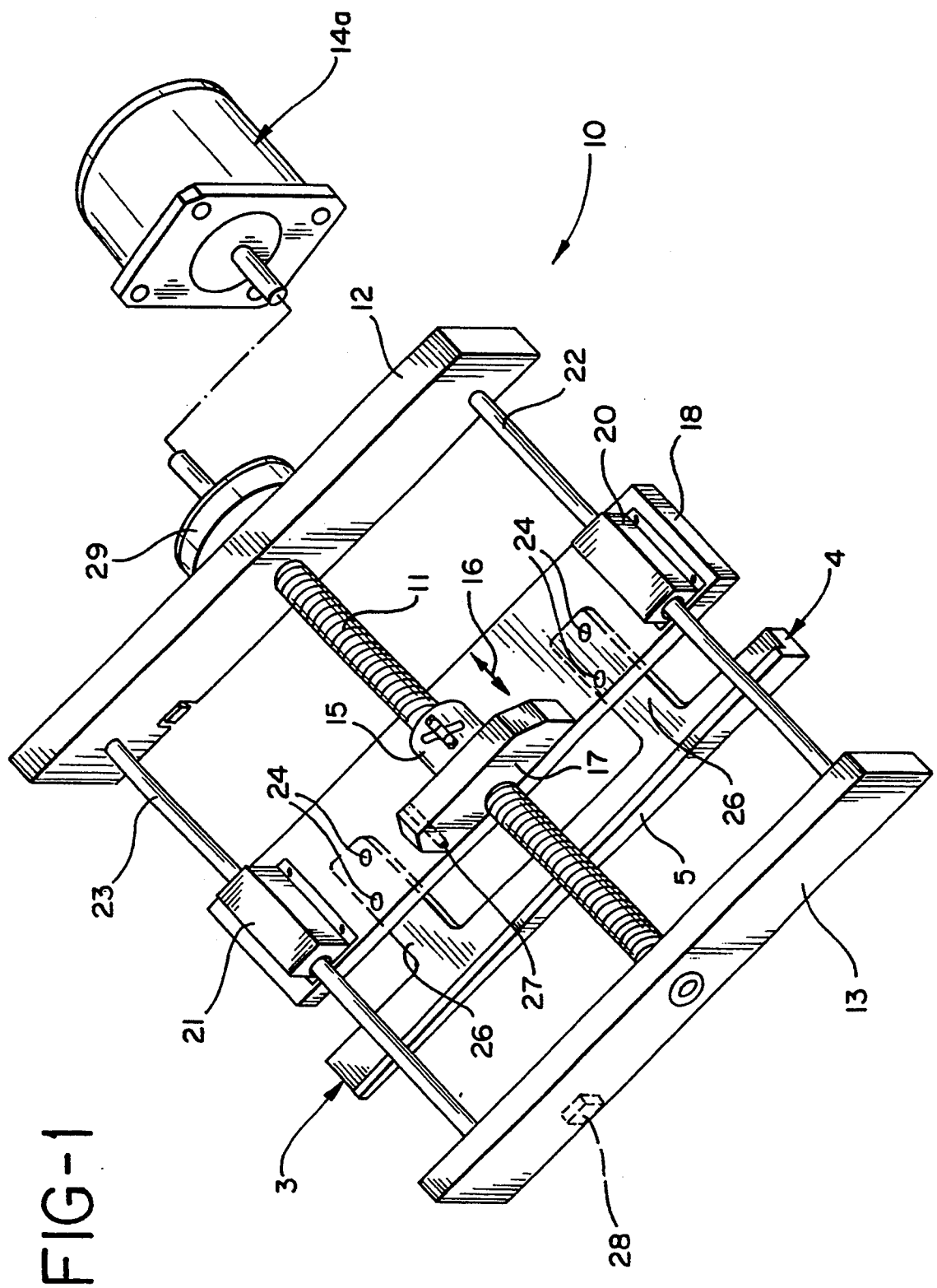

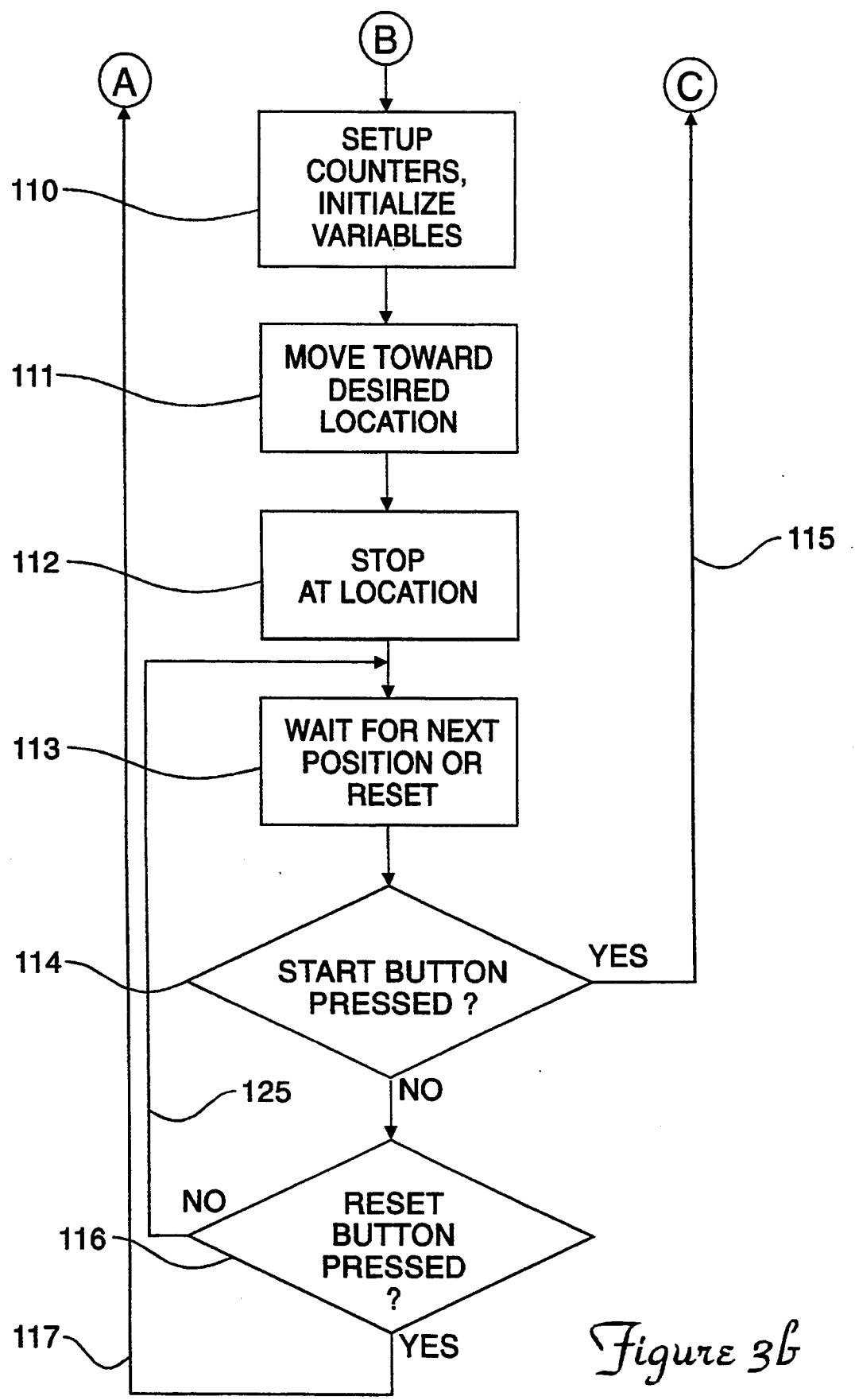

SYSTEM FOR ADJUSTING THE BACK GAUGE OF A FLAT STOCK MATERIAL WORKING APPARATUS

BACKGROUND OF THE INVENTION

FIELD OF THE INVENTION

The present invention relates to machines for shearing, bending or working substantially rigid, generally flat materials and, more particularly, to a material working machine having an automatic positioning system for adjusting the back gauge of the machine in preparation for the placement and working of the materials.

Machines for working relatively small flat sheets and other small articles are often hand or foot operated and provided with hand adjusted gauges for centering and/or aligning the articles with respect to the cutting blades, punching dies or bending bar. Alignment is achieved with respect to the working tool of the machine by adjusting a back gauge against which the worked material is positioned. The back gauge is positioned a desired distance from the cutting, punching or bending tool, and the article is cut, punched or bent to the desired adjusted dimension.

Unfortunately, the set-up, aligning, and calibrating of the back gauge of these material working machines, often requires significant adjustment time. It is not unusual, for example, for a skilled worker to spend half an hour adjusting the back gauge of a metal shearing device before the device can consistently shear metal parts to within ten thousandths of an inch of the desired dimension.

Highly accurate, numerically controlled devices have been used in large, automatic machines to position workpieces relative to the cutting or bending members. Such numerically controlled devices generally utilize programmed, feedback systems. Such sophisticated feedback systems are generally too elaborate and expensive for adaptation to small, manually operated machines. These closed-loop control devices are not cost effective for small production runs and/or manually operated material working machines.

One such closed-loop system for generating position signals to a servo control unit for moving the back gauge of a paper cutting machine is disclosed in U.S. Pat. No. 3,738,504, issued to Vail et al. Feedback signals provide binary coded position information associated with key control positions in the back gauge. Pulsed counting information is used to increment position changes in each interval between the key control positions. This closed-loop system utilizes an optical disk and requires feedback inputs. The paper cutting machine is completely automatic, not requiring the intervention of a human operator to initiate the aligning or cutting of the materials. Moreover, the back gauge is automatically adjusted with respect to the cutting blade by means of an AC motor-driven belt.

U.S. Pat. No. 4,280,182, issued to Mickowski, illustrates a typical automatically controlled die stamping device having a microprocessor, a memory, and closed-loop, servo-control circuitry. The computer memory contains data representing the position ordinance of each machine axis, which is utilized in an operational sequence defined by a multiple number of axis-related stamping programs. Binary coded data is used to position the die with respect to the workpiece. The system is completely automatic, requiring no intervention by an operator.

U.S. Pat. No. 4,371,942, issued to Damikolas, discloses a method and apparatus for automatically moving a cutting tool and workpiece into contact with each other. After selecting the material working mode of operation, the cutting tool and workpiece are moved towards each other; when they touch, the cutting tool is separated from the workpiece by a selected distance indicative or the dimension to be cut in the workpiece. Movement between the cutting tool and the workpiece is halted when a sound transducer indicates that contact has been made. In this way, an absolute position of the cutting tool with respect to the workpiece is determined and calibrated. Such a system calibrates the zero position of the workpiece for each article being cut. In other words, the zero position is continuously being readjusted.

Small, manually operated machines, on the other hand, still utilize a rather primitive manual trial and error adjustment mechanism and process. The adjustment mechanism usually consists of an inexpensive dual worm feed mechanism. Each worm feed of the dual worm mechanism is attached to an opposite side of the back gauge upon which the workpiece is aligned. Each one of the dual worm feed units in turn is caused to adjust, by manual means, first one, and then the opposite side of the back gauge. Each worm feed has a adjusting dial nut assembly for setting the position of its respective worm feed unit for adjusting its respective side of the back gauge. Upon aligning first one side of the back gauge, the other one of the dual worm feed units is adjusted in like manner.

Normally, such a system could provide an alignment of both sides of the back gauge with respect to the cutting tool in a few minutes, if it weren't for the problem of worm feed inaccuracy and backlash. All too often, one side must be backed off from its initial setting, when the other side of the back gauge is adjusted. When this happens, the dial nut of the previously adjusted feed unit must be disengaged to allow the feed unit for the first side to be adjusted. Error and backlash in the worm feed units causes a constant inaccuracy to be experienced in readjusting each position, such that the whole adjustment procedure becomes one of trial and error.

Such a trial and error procedure has been tolerated by reason of the fact that the amount of work contemplated for manually operated material working machines is small. Such small production runs do not warrant the expense of installing or utilizing precision worm feeds in such equipment. Particularly when the cost of present automatic adjusting means was appreciable as compared to the cost of the machine itself.

The present invention, while providing an automated system for accurately and precisely setting the back gauge of a manually operated, material working machine, does so without appreciably adding to the cost of the machine.

The invention accomplishes a low cost automatic alignment system by reason of the reduction of mechanical drive parts, together with inexpensive electronic control components. The invention replaces the dual worm feed of the prior art system with a single worm feed, featuring a precision, zero-backlash recirculating ball nut assembly. The worm feed is centered in a midportion of the back gauge, thus eliminating the need for alternate side adjustments. The worm feed is automatically driven to a selected position chosen by the operator. A desired back gauge position with respect to a work blade is selected by an operator using a thumbwheel switch or equivalent disposed on an input panel. The input setting is fed to a microprocessor controller that feeds drive signals to a stepper motor. The stepper motor drives the worm feed to a precise setting without using feedback circuitry, in accordance with the input. In other words, the present invention accomplishes low cost precision adjustment utilizing an open-loop circuit.

It is an object of the present invention to provide a low cost system for automatically and accurately positioning a back gauge of a manually operated, material working apparatus.

It is another object of this invention to provide an automatic positioning system featuring an open-loop circuit.

It is another object of the invention to provide a method for rapidly and precisely adjusting the back gauge and/or workpiece relative to a cutting, punching or bending tool without having to use trial and error.

SUMMARY OF THE INVENTION

In accordance with the present invention, there is provided a manually operated apparatus for working flat stock. The system has a mechanism for automatically positioning a mechanically adjustable back gauge to a predetermined position. The automatic positioning is accomplished by means of a programmable microcontroller that controls the movement of a worm drive through a stepper motor. The worm drive is used to move the back gauge with respect to a working tool. The operator of the system sets a desired position of the back gauge relative to the work tool via input thumbwheel switch or equivalent mounted on an control panel. The panel is connected to the microcontroller, and feeds the information thereto. The program of the microcontroller uses the thumbwheel switch input to drive the stepper motor in a fast drive mode until the back gauge comes into approximate vicinity of a starting position. Thereafter, the worm drive is driven at a slower speed to reach the start or zero position. Once having been calibrated, the back gauge is then directed to the desired position setting with respect to the working tool. The adjusting system can be used with cutting, bending and other low cost, material working apparatus having the common need for precision alignment.

BRIEF DESCRIPTION OF THE DRAWINGS

A complete understanding of the present invention may be obtained by reference to the accompanying drawings, when considered in conjunction with the detailed description, in which:

FIG. 1 shows a perspective, schematic view of the automatic back gauge positioning mechanism of the present invention;

FIGS. 3a and 3b illustrate a flow chart of the method of the invention as accomplished by the positioning mechanism and control system of the invention as respectively depicted in FIGS. 1 and 2.

For purposes of clarity and brevity, like elements and components will bear the same designation throughout the description of the figures.

DESCRIPTION OF THE PREFERRED EMBODIMENT

Generally speaking, the invention features an open-loop control system for relatively adjusting a workpiece with respect to a working tool, such as a cutting blade, punches or bending bar in a manually operated, materials working apparatus. The open-loop control system features a single worm drive for operatively adjusting the position of a back gauge. The workpiece, which is placed in contact with the back gauge, is thus assured of a proper position with respect to said working tool. The worm drive is precisely driven by a microprocessor controlled stepper motor. An operator of the material working apparatus instructs the microprocessor to adjust the back gauge to a desired position, via a plurality of simple control keys, such as a number of thumbwheel switches.

Figure 1A:
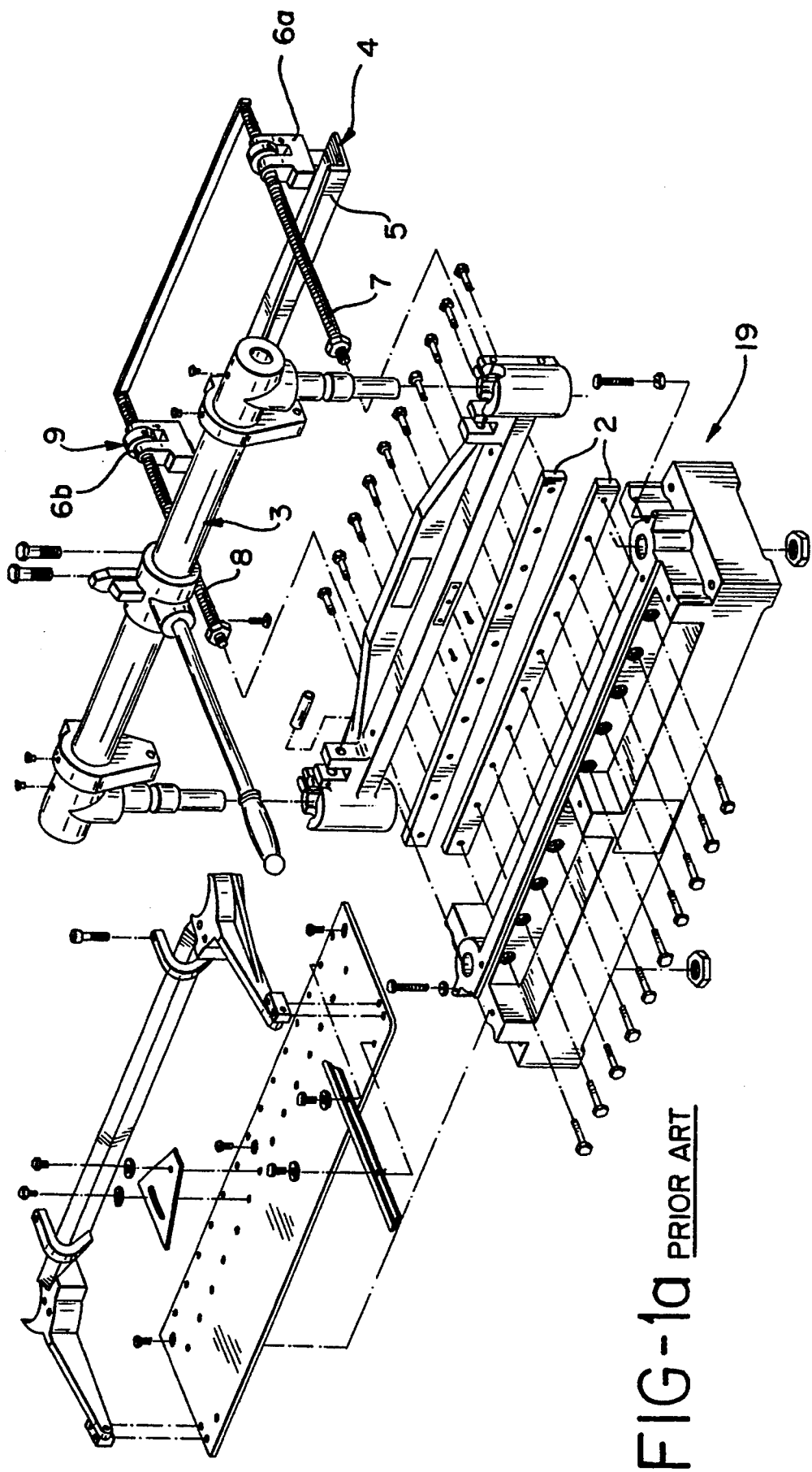
FIG. 1a depicts a perspective, exploded view of a manually operated, material working apparatus for shearing flat stock of the prior art, in combination with a manually operated, back gauge adjustment apparatus.

Now referring to FIG. 1a, a back gauge adjusting apparatus 9 of the prior art is illustrated in combination with a flat stock cutting apparatus 19 having a back gauge 5 disposed adjacent a pair of flat stock cutting blades 2. The adjusting apparatus 9 typically features a manually operated, dual worm feed mechanism comprising spaced-apart worm positioning units 7 and 8, respectively. Each of the worm positioning units carries a respective dial nut assembly 6a and 6b mounted on opposite ends of a back gauge 5. The back gauge is positioned relative to a working tool, such as a pair of cutting blades 2, or a bending bar (not shown).

The back gauge 5 is positioned by first turning dial nut assembly 6a, for example, until a given or desired position is reached by the right side 4 of the back gauge 5. Then, the dial nut assembly 6b is adjusted until the left side 3 of the back gauge 5 reaches the desired position. After having adjusted both dial nut assemblies 6a and 6b, respectively, the right side 4 of the back gauge is checked with respect to its last position.

It will be often discovered that having adjusted the left side 3 of the back gauge 5, the setting for the right side 4 has been changed. The operator of the apparatus 9 will now usually back off the dial nut assembly 6a to readjust the position of the right side 4, and then make any appropriate readjustment to the left side 3 of the back gauge 5.

However, since the dial nut assemblies 6a and 6b are both subject to error and backlash, the readjustment procedure is truly a hit-or-miss affair. In other words, it will require a certain amount of trial and error to finally position the back gauge 5 correctly on both sides 3 and 4.

Referring to FIG. 1, an automatic back gauge adjustment apparatus 10 of this invention is shown. The automatic back gauge adjustment apparatus 10 is to be used in combination with the flat stock cutting apparatus 19 shown in FIG. 1a, but is shown alone in this view, for the sake of clarity. It should be understood that, for purposes of the present disclosure, material working apparatus, such as punching, bending or shearing devices, as aforementioned, are meant to include and encompass other machining or operating devices having one or multiple axes of adjustment and that such other devices are intended to lie within the scope of the present invention. The back gauge adjustment apparatus 10 is illustrated as comprising a single, worm drive screw 11 rotatively mounted between stationary, bracing support bars 12 and 13, respectively. The worm drive screw 11 is driven by a stepper motor 14a that receives its stepping signals from a microcontroller 25, shown in FIG. 2, as will be explained in more detail hereinafter.

A recirculating ball nut 15 is driven forward and backward by the worm drive screw 11, as shown by arrows 16. The recirculating ball nut 15 is affixed to vertical support member 17, through which the worm drive screw 11 freely passes. The vertical support member 17 is secured to a movable cross-bar 18. The movable cross-bar 18 is movably supported by respective linear bearings 20 and 21, which slidably ride upon respective cylindrical support shafts 22 and 23, which are respectively anchored in bracing support bars 12 and 13.

As aforementioned, the worm drive screw 11 is rotatively driven by the stepper motor 14a, which causes the recirculating ball nut 15 and the cross-bar 18 to move horizontally (arrows 16). The back gauge 5 which is secured to the cross-bar 18 by two adjacent pairs of set screws 24 that anchor into the back gauge flanges 26, are likewise caused to move with the cross-bar 18.

The movement (arrows 16) of the back gauge 5 is very precise, because the recirculating ball nut 15 driven by worm drive screw 11, is substantially without backlash, plus having an accuracy sufficient to provide a product with about ten times better precision than now achievable. Thus, the back gauge can be driven to a precise position with respect to the cutting blades 2 (shown in FIG. 1a). Thus, this open-loop drive system achieves the accuracy and precision that the more expensive closed-loop systems accomplish. However, the present invention achieves the result at a much reduced cost, thereby making this back gauge adjustment system available for manually operated, material working machinery. Reduction of the cost is achieved in part by reducing the number of worm screw and dial nut assemblies from two (prior art) to one.

The back gauge 5 is driven up to the cutting blades 2 (shown in FIG. 1a). This is referred to herein as the "home" or "zero" position. The "home" position can be changed or adjusted by the adjustment screw 27 disposed in the vertical support member 17.

The stepper motor 14a drives the worm drive screw 11 at a fast speed until the back gauge 15 comes into close proximity to the "home" position, and then proceeds to drive the back gauge 5 at a slower speed. A micro switch 28 located on the bracing support member 13 senses when the back gauge 5 is within a given distance of "home".

Figure 2:
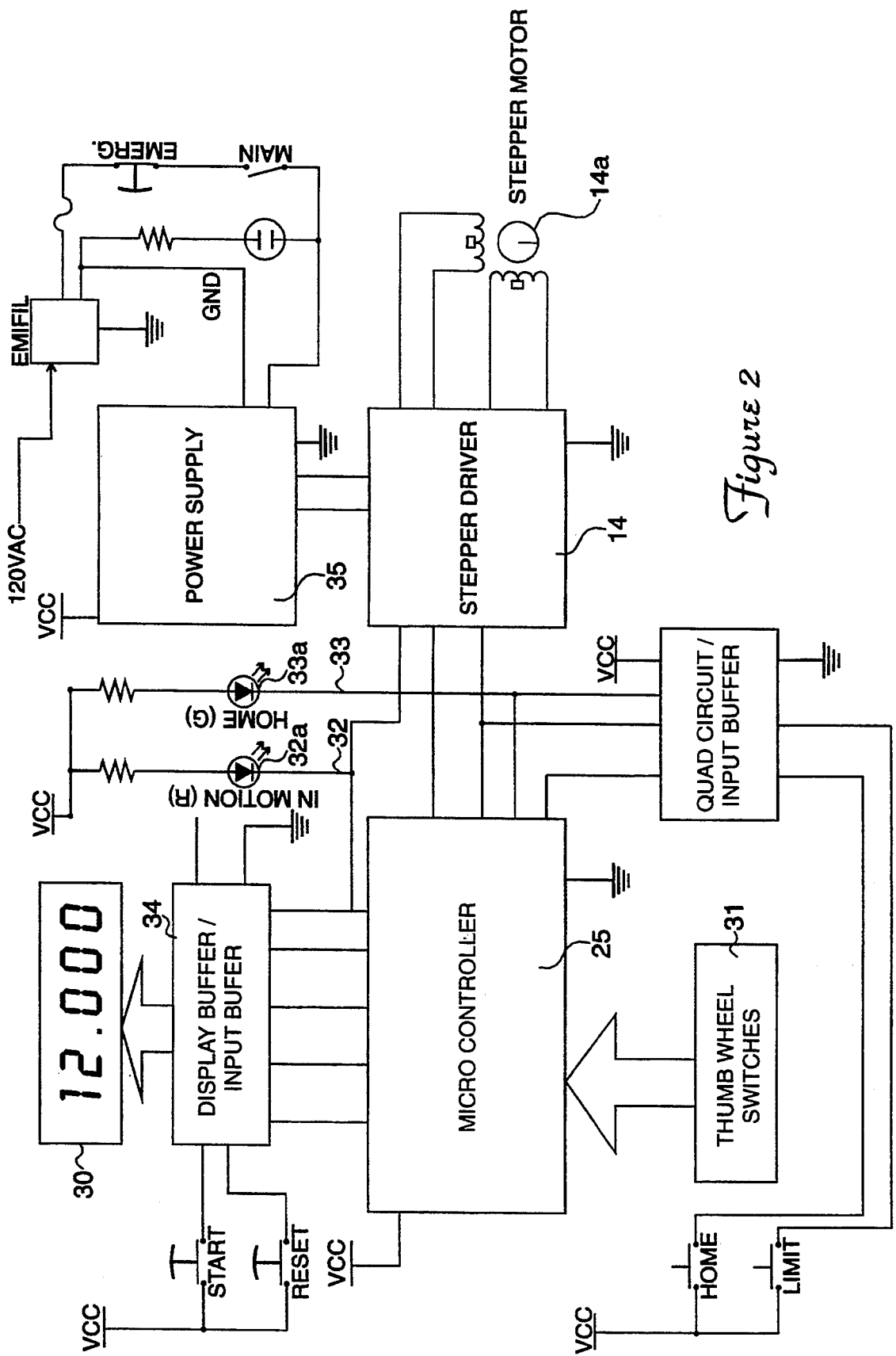
FIG. 2 is a block diagram of the control system for the positioning mechanism of the present invention illustrated in FIG. 1.

Referring to FIG. 2, the desired position of the back gauge 5 is selected by the operator of the material working machine 19, by turning a number of thumbwheel switches 31 that are mounted on a control panel (not shown). The thumbwheel switches 31 provide this input information to a microcontroller 25, or programmed microprocessor. The microcontroller 25, in turn, provides the stepper motor 14a with drive pulses for driving the screw drive worm 11. The program of the microcontroller 25 operates the stepper motor 14a in both a fast and slow speed mode, as aforementioned. The back gauge is adjusted to a desired position in a matter of seconds. The display 30, which can be an LED display, indicates the position of the back gauge 5 while it is in motion and when it has reached a desired position. This information is fed via lines 32 and 33 to the status indicators 32a and 32b respectively. The power supply 35 furnishes the power to operate the stepper motor drive 14, and microcontroller as shown.

Figure 3A:
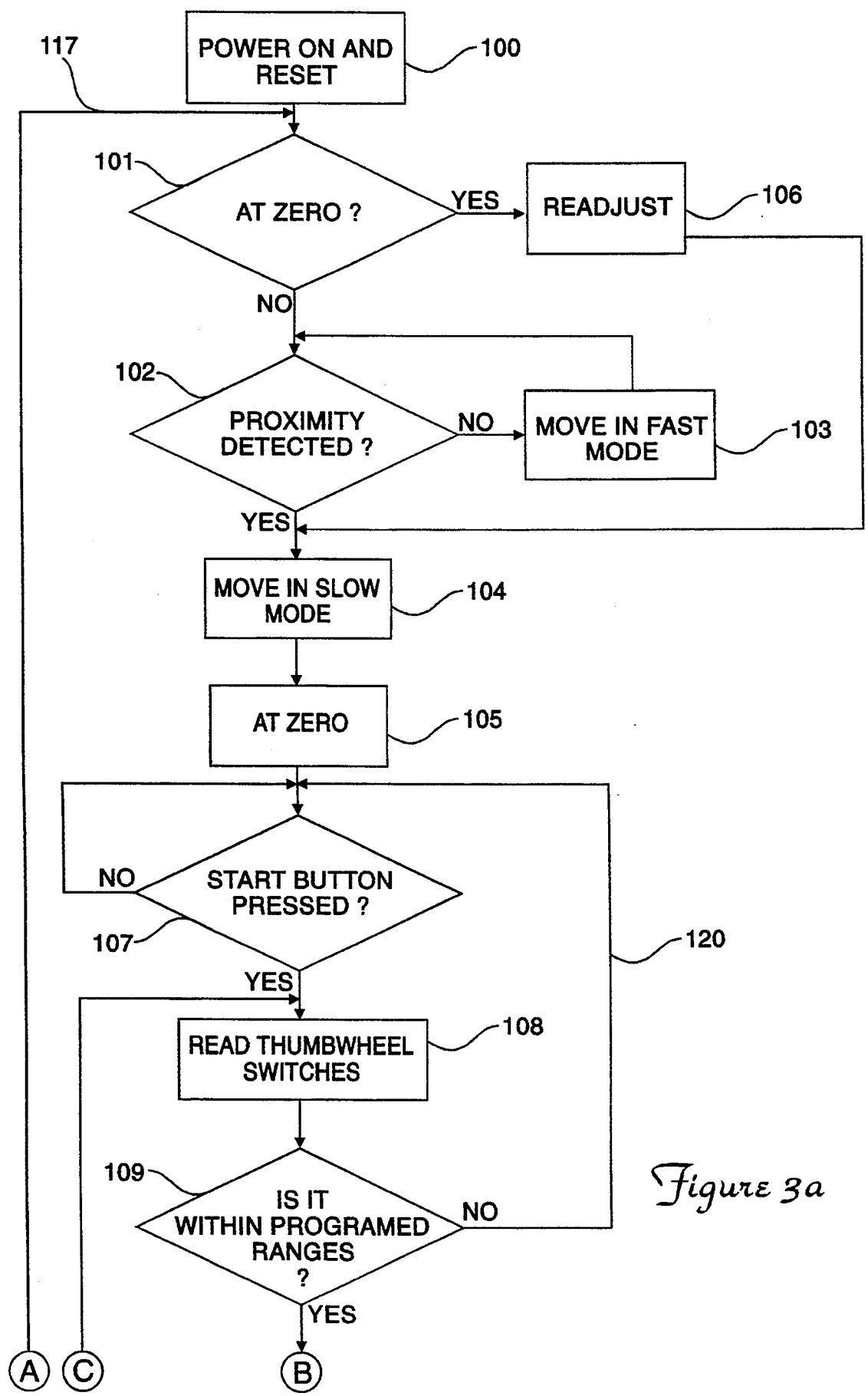

FIGS. 3a and 3b illustrate a flow chart of the operation of the invention, as depicted in FIGS. 1 and 2. The back gauge adjustment system is calibrated every time the system is turned on (block 100). When the power is turned on, the system determines if the back gauge is at the zero or "home" position via decision block 101. If the back gauge has been left in a working position other than zero, the system interrogates the proximity sensor 28 (decision block 102), and operates the stepper motor 14a in the fast speed mode (block 103) in closed-loop fashion until proximity is detected. When proximity is detected, the stepper motor is operated in a slow mode (block 104) until the zero position is reached (block 105).

If the back gauge has been left at the zero position, then the system readjusts, or recalibrates the zero setting via block 106. The stepper motor is moved at slow speed away from, and then back towards the zero position at slow speed (block 104), until the "home" position is reached (block 105).

The system then determines whether the operator of the material working machine has pressed the start button (decision block 107). If the start button has been pressed, the system then reads the thumb wheel switches to obtain the desired position for the back gauge (block 108). Having read the position that the operator desires for the back gauge, the system determines whether the desired position is within the operative drive limits of the system, as per decision block 109. The operative drive limits are between fifteen thousandths of an inch from absolute zero or "home", and about twelve inches, which represents the absolute driving limit of the recirculating ball nut travel along the worm drive screw. If the indicated travel is beyond the system limits, the system indicates that a proper setting is desired, and continues to detect whether the start button has been pressed via return loop 120.

Once the proper setting is read, the stepper motor counters are initialized (block 110), and the stepper motor is actuated to move the screw drive worm a desired number of rotations to accomplish the movement of the back gauge (block 111). The system then stops the stepper motor rotation (block 112), and waits for the next location input or a reset signal (block 113).

If a new position is desired, the system inquires via decision block 114, whether the start button has been pressed.

If the start button has been pressed, the system interrogates the thumb wheel switches (block 108) via return loop 115. If this is not the case, the next decision block 116 is entered to determine whether the reset button has been pressed. If it has not, the system waits for the next position (block 113) via return loop 125.

If the reset button has been pressed, the system returns to decision block 101 via return loop 117, and returns the back gauge to its "home" position via blocks 101 through 105.

The zero-backlash ball nut assembly can be purchased from Ball Screws and Actuators Co., Inc., of San Jose, Calif. The stepping motor utilized in this invention is sold under the trade name "VEXTA". A typical material working assembly for use in combination with the invention is a Di-Acro Hand Shears, Model No. 12 or 24.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. An open-loop system for automatically adjusting materials in relative position to a working tool, in combination with a manually operated material working apparatus having an adjustable back gauge, comprising:
   back gauge positioning means operatively connected to said adjustable back gauge for precisely and automatically moving said back gauge to a desired position including:
   i) a single worm drive connected to a mid-portion of said back gauge for adjusting said back gauge to said desired position, said single worm drive comprising a recirculating ball nut having substantially zero-backlash, said recirculating ball nut being supported by said worm drive, and driven by rotative drive movement of said worm drive, said recirculating ball nut being operatively connected to said back gauge for adjusting said back gauge in response to said rotative drive movement of said worm drive;
   ii) a stepper motor connected to said worm drive for driving said worm drive; and
   iii) a controller connected to said stepper motor for supplying signals to said stepper motor for driving said worm drive to adjust said back gauge, said controller further comprising a start-up program for stepping said stepping motor to position said back gauge to a home position at start-up, prior to adjusting said back gauge to said desired position, and a sensor disposed adjacent a back gauge home position, said proximity sensor being operatively connected to the stepper motor via said controller for signalling said stepper motor that said back gauge is approaching said home position, said start-up program for stepping said stepping motor further comprising instructions for stepping said stepping motor in a fast mode until said sensor indicates that said back gauge is approaching said home position, and thereafter stepping said stepping motor in a slow mode until said home position is reached.

2. The open-loop system in accordance with claim 1, wherein said manually operated material working apparatus comprises a flat stock shearing device disposed adjacent said back gauge for cutting said flat stock to a desired size.

3. The open-loop system in accordance with claim 1, wherein said back gauge positioning means further comprises an input panel, said input panel connected to said controller for instructing said controller with respect to the position desired for said back gauge.

4. The open-loop system in accordance with claim 3, wherein said input panel comprises at least one thumbwheel switch operatively connected to said controller for selecting a desired position for said back gauge.

5. The open-loop system in accordance with claim 3, wherein said input panel comprises a display operatively connected to said controller for indicating a back gauge position.

6. The open-loop system in accordance with claim 1, wherein said controller of said back gauge positioning means comprises a microprocessor.

7. An open-loop system for automatically adjusting materials in relative position to a working tool, in combination with a manually operated material working apparatus having an adjustable back gauge, comprising:
   back gauge adjustment means operatively connected to said adjustable back gauge for precisely and automatically moving said back gauge to a desired position including:
   i) single drive means connected to a mid-portion of said back gauge for adjusting said back gauge to said desired position in response to a desired position input, said single drive means comprising a recirculating ball nut having substantially zero-backlash, said recirculating ball nut being supported by said single drive means, and driven by rotative drive movement of said single drive means, said recirculating ball nut being operatively connected to said back gauge for adjusting said back gauge in response to said rotative drive movement of said single drive means;
   ii) a controller connected to said drive means for supplying signals to said drive means for driving said drive means to adjust said back gauge, said controller including means for driving said single drive means in a fast mode and a slow mode, said slow mode being initiated when said single drive means is approaching proximate said desired position; and
   iii) input means operatively connected to said controller for providing a desired position input to said drive means.

8. The open-loop system in accordance with claim 7, wherein said manually operated material working apparatus comprises a flat stock shearing device disposed adjacent said back gauge for cutting said flat stock to a desired size.

9. The open-loop system in accordance with claim 7, wherein said input means further comprises a display operatively connected to said controller and to said drive means for indicating a back gauge position.

* * * * *